United States Patent
Oh

(10) Patent No.: US 8,210,121 B2
(45) Date of Patent: Jul. 3, 2012

(54) CENTRAL SUPPLY SYSTEM OF ALIGNMENT MATERIAL AND APPARATUS FOR FORMING ALIGNMENT LAYER HAVING THE SAME

(75) Inventor: Hyuck Oh, Seoul (KR)

(73) Assignee: LG Display Co., Ltd., Seoul (KR)

( * ) Notice: Subject to any disclaimer, the term of this patent is extended or adjusted under 35 U.S.C. 154(b) by 750 days.

(21) Appl. No.: 12/318,533

(22) Filed: Dec. 30, 2008

(65) Prior Publication Data
US 2010/0071620 A1 Mar. 25, 2010

(30) Foreign Application Priority Data
Sep. 24, 2008 (KR) .......................... 10-2008-0093831

(51) Int. Cl.
B05C 5/02 (2006.01)
(52) U.S. Cl. ........ 118/688; 118/693; 118/694; 118/712; 118/46; 118/300; 118/304
(58) Field of Classification Search .................. 118/688, 118/693, 694, 712, 300, 304, 46; 427/427.2, 427/428.18, 428.19, 8; 438/14; 222/64, 222/65
See application file for complete search history.

(56) References Cited

U.S. PATENT DOCUMENTS

| | | | | |
|---|---|---|---|---|
| 5,405,443 A | * | 4/1995 | Akimoto et al. | 118/668 |
| 6,245,148 B1 | * | 6/2001 | Liang et al. | 118/683 |
| 7,189,434 B2 | * | 3/2007 | Kim | 427/427.2 |

FOREIGN PATENT DOCUMENTS
TW 418419 B 1/2001
* cited by examiner

*Primary Examiner* — Laura Edwards
(74) *Attorney, Agent, or Firm* — Morgan, Lewis & Bockius LLP

(57) ABSTRACT

An apparatus for forming an alignment layer comprising: at least one alignment layer forming line having a plurality of alignment layer forming units; a plurality of alignment material coating devices disposed at each alignment layer forming unit and configured to coat an alignment material on a substrate of the corresponding alignment layer forming units; at lest one alignment material supplying unit having a plurality of second alignment material containers for supplying the alignment material to each alignment material coating device; a central supplying unit connected to the at least alignment material supplying unit and having at least one first alignment material container for supplying the alignment material to the at least one alignment material supplying unit; a supplying pipe configured to connect the at least one alignment material supplying unit to the central supplying unit; and a controller configured to measure the remnant amount of alignment material of the at least one alignment material supplying unit so as to supply the alignment material in the first alignment material container to the plurality of second alignment material containers via the supplying pipe when the measured remnant amount of the alignment material is smaller than a minimum amount thereof, and to measure the remnant amount of the alignment material in the central supplying unit so as to replace the first alignment material container with a new first alignment material container fully filled with the alignment material when the remnant amount of the alignment material in the central supplying unit is smaller than the minimum amount thereof.

14 Claims, 6 Drawing Sheets

CENTRAL SUPPLY SYSTEM OF ALIGNMENT MATERIAL AND APPARATUS FOR FORMING ALIGNMENT LAYER HAVING THE SAME

The present disclosure relates to subject matter contained in priority Korean Application No. 10-2008-0093831, filed on Sep. 24, 2008, which is herein expressly incorporated by reference in its entirety.

BACKGROUND OF THE INVENTION

1. Field of the Invention

The present invention relates to an apparatus for forming an alignment layer, and particularly, to a central supplying unit of an alignment material capable of rapidly performing processes and efficiently managing the alignment material by allowing an automatic supply of the alignment material from a central supplying unit to a plurality of alignment layer forming lines, and an apparatus for forming an alignment layer having the same.

2. Background of the Invention

Recently, various portable electric devices, such as mobile phones, personal digital assistant (PDA), and note book computers have been developed, because of their small size, light weight, and power-efficient operations. Accordingly, flat panel display devices, such as liquid crystal displays (LCDs), plasma display panels (PDPs), field emission displays (FEDs), and vacuum fluorescent displays (VFDs), have been developed. Of these flat panel display devices, the LCDs are currently mass produced because of their simple driving scheme and superior image quality.

FIG. 1 is a cross sectional view of an LCD device according to the related art. As shown in FIG. 1, an LCD device 1 comprises a first substrate 3, a second substrate 5 and a liquid crystal layer 7 interposed between the first and second substrates 3 and 5. Although not shown in the drawing, the first substrate 3 is a driving device array substrate which has a plurality of pixels, each of which is provided with a driving device such as a thin film transistor (FTF). The second substrate 5 is a color filter substrate which has a color filter layer for implementing actual colors. Also, each of the first substrate 3 and the second substrate 5 is provided with pixel electrodes and common electrodes, and coated with alignment layers for aligning liquid crystal molecules of the liquid crystal layer 7.

The first and second substrates 3 and 5 are bonded to each other by a sealing material 9. The liquid crystal layer 7 is formed between the first and second substrates 3 and 5 bonded to each other. With such configuration, the driving device formed at the first substrate 3 drives liquid crystal molecules to control an amount of light transmitted through the liquid crystal layer 7, thereby displaying information.

A fabricating procedure for an LCD device may be divided into a driving device array substrate process for forming a driving device on the first substrate 3, a color filter substrate process for forming a color filter on the second substrate 5, and a cell process. Such fabricating procedure for the LCD device will be described with reference to FIG. 2.

First, a plurality of gate lines and data lines arranged on the first substrate 3 to define pixel areas are formed by the driving device array process, and then a TFT as a driving device connected to the gate line and the data line is formed at each pixel area (S101). Also, a pixel electrode, which is connected to the TFT to drive the liquid crystal layer 7 according to a signal applied via the TFT, is formed through the driving device array process.

R, G and B color filter layers for implementing colors and common electrodes are formed on the second substrate 5 through the color filter process (S104).

After coating an alignment layer on each of the first and second substrates 3 and 5, the alignment layers are rubbed to provide an alignment controlling force or a surface fixing force (i.e., a pretilt angle and an alignment direction) to the liquid crystal molecules of the liquid crystal layer 7 formed between the first substrate 3 and the second substrate 5 (S102 and S105). A spacer is then dispersed onto the first substrate 3 for maintaining a uniform cell gap between the first and second substrates 3 and 5. A sealing material is coated on peripheral portions of the second substrate 5, and thereafter the first and second substrates 3 and 5 are bonded to each other by compressing (S103, S106 and S107).

In the meantime, the first and second substrates 3 and 5 are both made from a glass substrate, and include a plurality of unit panel areas on each of which the TFT as the driving device and the color filter layer are formed. So, in order to fabricate each liquid crystal panel, the glass substrate should be cut into unit panels and then processed (S108). Liquid crystal is injected into each of the processed liquid crystal panels through a liquid crystal injection hole, which is then encapsulated so as to form the liquid crystal layer. The thusly-completed liquid crystal panel is inspected to finally fabricate an LCD device (S109 and S110).

The LCD device having fabricated through those processes uses an electro-optic effect. The electro-optic effect is determined by anisotropy of liquid crystal molecule and a molecule arrangement state of liquid crystal molecules. Accordingly, the control of the liquid crystal molecule arrangement has a great influence on display quality of the LCD device. Hence, an alignment layer forming process for more effectively aligning liquid crystal molecules is very important in the fabricating procedure for the LCD device in relation to characteristics of image quality.

An alignment layer is formed by coating an alignment material on a substrate by means of a coating device. Here, a plurality of alignment layer coating devices are disposed on the process line for an LCD device and each alignment layer coating device is provided with an alignment material supplying unit so as to allow the supply of the alignment material to each of the alignment material coating device, thereby coating the alignment material on the substrate.

However, the alignment material coating device may occur the following problems. As the alignment material is coated on the substrate by the alignment material coating device, the alignment material contained in the alignment material supplying unit, through which the alignment material is supplied to each alignment material coating device, is decreased. When the alignment material in the alignment material supplying unit is completely consumed, the alignment material should be newly supplied into the alignment material supplying unit. In general, the alignment material supplying unit is provided with a supply tank and an alignment material container disposed in the tank for containing the alignment material. In order to supply the alignment material into the alignment material supplying unit, the alignment material container from which the alignment material has completely been consumed should be replaced by a new alignment material container fully filled with an alignment material.

However, the alignment material container is replaced by an operator himself, which requires long time to replace it and increased replacement cost. Furthermore, the plurality of alignment material coating devices are provided on the LCD device process line so as to coat alignment layers on a plurality of substrates at once. Accordingly, much time loss occurs upon replacing the alignment material containers of the plurality of alignment material supplying units provided at each alignment material coating device, thereby increasing the replacement cost. In addition, the supply of the alignment material into the alignment material supplying unit, namely, keeping, carrying and replacing of the alignment material container are all executed by an operator's own work, which causes a problem in the management of the plurality of alignment material containers.

SUMMARY OF THE INVENTION

Therefore, an object of the present invention is to provide a central supplying system for a liquid crystal alignment material capable of preventing process delay and cost increase due to a time delay for supplying the alignment material, by allowing a central supplying unit of an alignment material to automatically supply the alignment material into alignment material supplying units of each alignment material coating device provided on each alignment layer forming line, and an apparatus for forming an alignment layer having the same.

To achieve these and other advantages and in accordance with the purpose of the present invention, as embodied and broadly described herein, there is provided an apparatus for forming an alignment layer comprising: at least one alignment layer forming line having a plurality of alignment layer forming units; a plurality of alignment material coating devices disposed at each alignment layer forming unit and configured to coat an alignment material on a substrate of the corresponding alignment layer forming units; at lest one alignment material supplying unit having a plurality of second alignment material containers for supplying the alignment material to each alignment material coating device; a central supplying unit connected to the at least alignment material supplying unit and having at least one first alignment material container for supplying the alignment material to the at least one alignment material supplying unit; a supplying pipe configured to connect the at least one alignment material supplying unit to the central supplying unit; and a controller configured to measure the remnant amount of alignment material of the at least one alignment material supplying unit so as to supply the alignment material in the first alignment material container to the plurality of second alignment material containers via the supplying pipe when the measured remnant amount of the alignment material is smaller than a minimum amount thereof, and to measure the remnant amount of the alignment material in the central supplying unit so as to replace the first alignment material container with a new first alignment material container fully filled with the alignment material when the remnant amount of the alignment material in the central supplying unit is smaller than the minimum amount thereof.

The alignment layer forming line is implemented as multi-model alignment layer forming lines which form different models of alignment layers, and the central supplying unit is provided with a plurality of supplying portions each configured to supply the alignment material to the alignment material supplying unit, which supplies the alignment material to the alignment material coating device on each multi-model alignment layer forming line. Valves are disposed at the supplying pipe thus to control a supply amount of the alignment material supplied from the central supplying unit to the alignment material supplying unit according to a signal of the controller.

The alignment material supplying unit may include a second tank in which the second alignment material container is accommodated, a supplying pipe disposed at the second tank and configured to supply the alignment material to the alignment material coating device, and a second gas supplying pipe disposed at the second tank and configured to apply pressure to the alignment material in the second alignment material container in cooperation with gas supplied therethrough. The central supplying unit includes a first tank in which the first alignment material container is accommodated, and a first gas supplying pipe disposed at the first tank, and configured to supply the alignment material to the alignment material supplying unit by applying pressure to the alignment material within the alignment material container in cooperation with gas supplied therethrough.

The controller may include an input unit in which weights of the remnant alignment materials measured by first and second weight measuring portions are input, the first and second weight measuring portions being disposed at the central supplying unit and the alignment material supplying unit, respectively, an alignment material remnant amount detecting portion configured to convert into volumes the weights of the remnant alignment materials input from the first and second weight measuring portions so as to detect each remnant amount of the alignment material, and an alignment material supplying determining portion configured to operate the valves when the alignment material should be supplied to the alignment material supplying unit based upon the remnant amount of the alignment material detected by the alignment material remnant amount detecting portion and operate the robot when the alignment material should be supplied to the central supplying unit.

Also, the present invention may be applicable to a seal line forming apparatus for forming a seal line by automatically supplying a sealant to a central supplying unit and a liquid crystal dispensing apparatus for forming a liquid crystal layer by dispensing a liquid crystal on a substrate, as well as to the apparatus for forming the alignment layer.

The present invention is configured to allow a central supplying unit of an alignment material to automatically supply an alignment material to an alignment material supplying unit of an alignment material coating device disposed at each alignment layer forming line, so as to prevent a process delay and cost increase due to a time delay to supply the alignment material.

In addition, the remnant amount of the alignment material in each alignment material container can automatically be measured by the weight measuring portions in real time, which allows the determination of the remnant alignment material within each alignment material container, resulting in preventing the alignment material from being unnecessarily consumed.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

Figure 1:
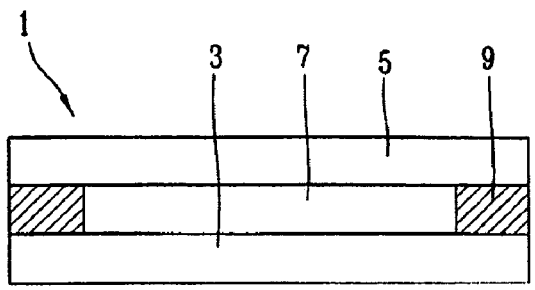
FIG. 1 is a schematic view showing a configuration of a typical LCD device.
Figure 2:
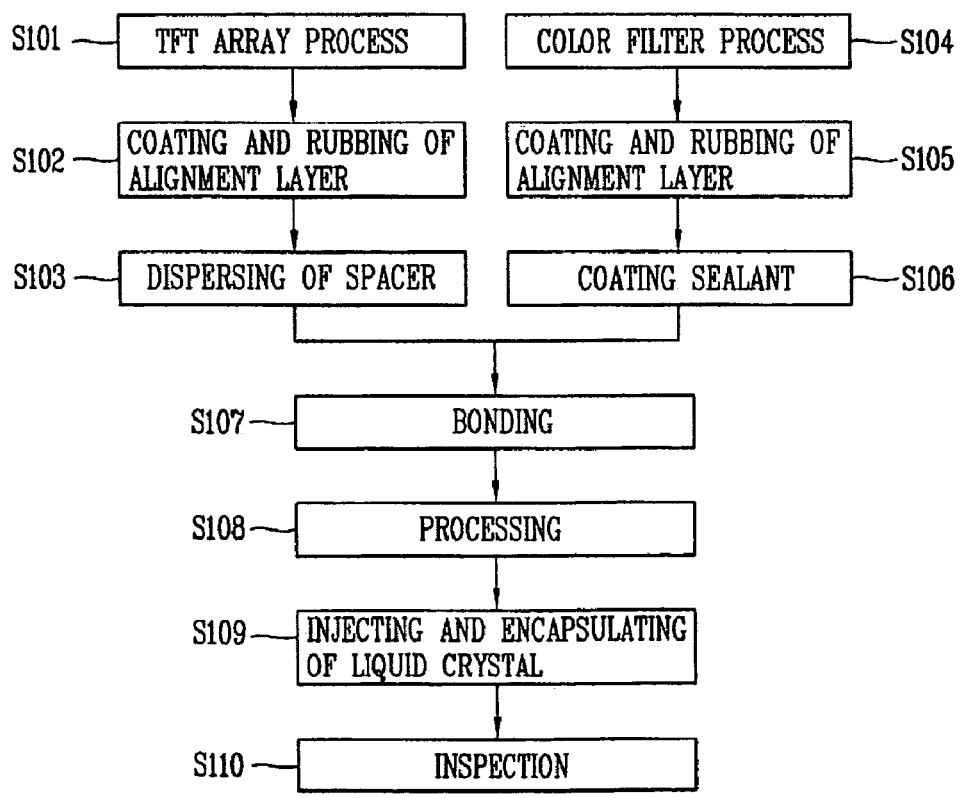
FIG. 2 is a flowchart showing a method for fabricating a typical LCD device.
Figure 3:
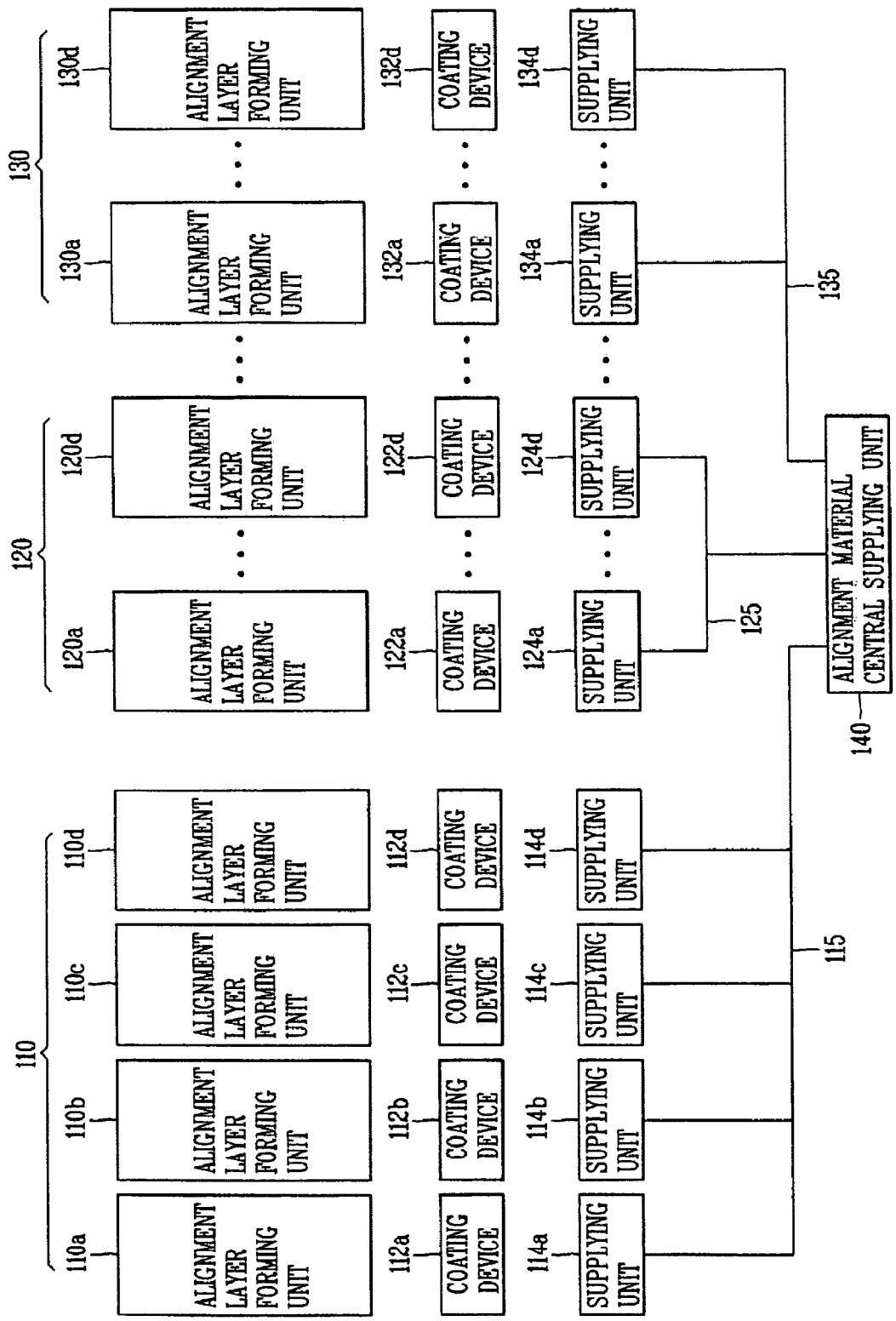
FIG. 3 is a view of an apparatus for forming an alignment layer according to the present invention.

FIG. 3 schematically shows an apparatus for forming an alignment layer of an LCD device according to the present invention.

As shown in FIG. 3, an apparatus for forming an alignment layer according to the present invention may include a plurality of alignment layer forming lines 110, 120 and 130 with a plurality of alignment layer forming units 110a-110d, 120a-120d and 130a-130d, alignment material coating devices 112a-112d, 122a-122d and 132a-132d respectively disposed at the plurality of alignment layer forming units 110a-110d, 120a-120d and 130a-130d for coating an alignment material on a substrate loaded onto each of the alignment layer forming units 110a-110d, 120a-120d and 130a-130d, alignment material supplying units 114a-114d, 124a-124d and 134-134d connected to the alignment material coating devices 112a-112d, 122a-122d and 132a-132d for supplying an alignment material, such as polyimide or polyamide, to each of the alignment material coating devices 112a-112d, 122a-122d and 132a-132d, and an alignment material central supplying unit 140 (hereinafter, referred to as 'central supplying unit 140') for supplying an alignment material to each of the alignment material supplying units 114a-114d, 124a-124d and 134-134d.

Each of the plurality of alignment layer forming lines 110, 120 and 130 includes the plurality of alignment layer forming units 110a-110d, 120a-120d and 130a-130d. The plurality of alignment layer forming units 110a-110d, 120a-120d and 130a-130d included in one alignment layer forming line 110, 120 and 130 have the same alignment layer forming condition. That is, an area of a substrate on which an alignment layer is formed, a thickness or type of alignment layer and the like are equally applied to each of the alignment layer forming lines 110, 120 and 130. Also, each of the alignment layer forming lines 110, 120 and 130 has an alignment layer forming condition different from that of another alignment layer forming line 110, 120 and 130. As such, since the alignment layer forming units 110a-110d, 120a-120d and 130a-130d disposed at each alignment layer forming line 110, 120 and 130 has a different alignment layer forming condition from the alignment layer forming units 110a-110d, 120a-120d and 130a-130d disposed at another alignment layer forming line 110, 120 and 130, multi-model LCD devices can be fabricated by the alignment layer forming lines 110, 120 and 130. In other words, the present invention can be configured such that an alignment material is supplied to the apparatus for forming the alignment layer capable of fabricating multi-model LCD devices.

Each of the alignment layer forming units 110a-110d, 120a-120d and 130a-130d is provided with the alignment material coating devices 112a-112d, 122a-122d and 132a-132d, thus to coat an alignment material on a substrate loaded on each of the alignment layer forming units 110a-110d, 120a-120d and 130a-130d. The alignment material coating devices 112a-112d, 122a-122d and 132a-132d are connected to the alignment material supplying units 114a-114d, 124a-124d and 134-134d, respectively, so as to supply an alignment material to the corresponding alignment material coating devices 112a-112d, 122a-122d and 132a-132d. The alignment material supplying units 114a-114d, 124a-124d and 134-134d are connected to the central supplying unit 140, respectively, via first supply pipes 115, 125 and 135, so as to allow the supply of the alignment material from the central supplying unit 140 to each of the alignment material supplying units 114a-114d, 124a-124d and 134-134d.

Figure 4:
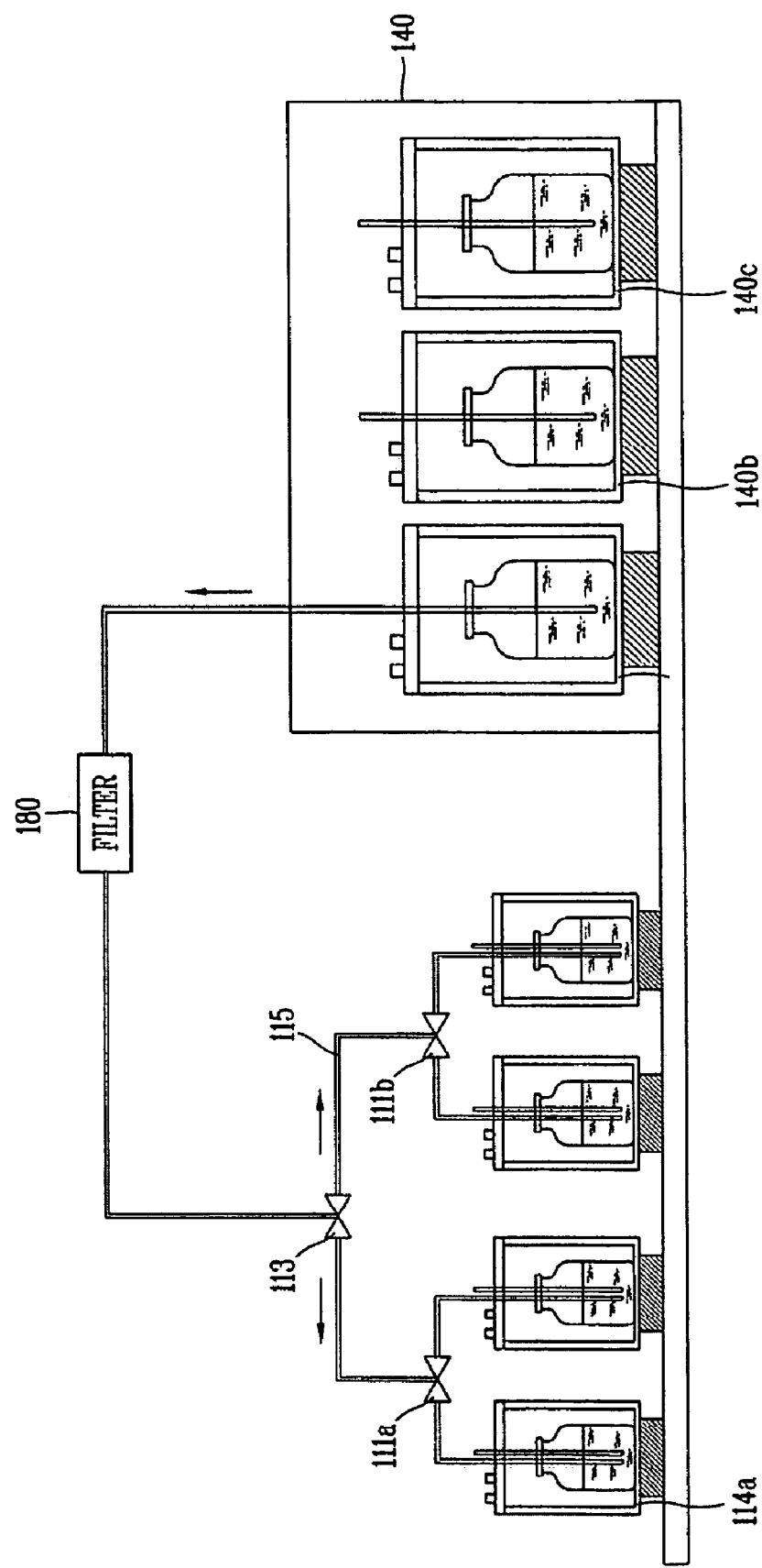
FIG. 4 is a view showing an alignment material supplying system in the apparatus for forming the alignment layer according to the present invention.

FIG. 4 shows an alignment material supplying system of the apparatus for forming the alignment layer according to the present invention, which shows a connection between the central supplying unit 140 and the alignment material supplying units 114a-114d, 124a-124d and 134-134d. Here, the drawings shows only the central supplying unit 140 and the alignment material supplying units 114a to 114d corresponding to one alignment layer forming line. Although not shown in the drawing, the same connection may be applied to the connection between another 124a-124d and 134-134d.

As shown in FIG. 4, the central supplying unit 140 is provided with a plurality of central supplying portions 140a to 140d, each of which is connected to the alignment material supplying units 114a-114d, 124a-124d and 134-134d of the corresponding alignment layer forming lines 110, 120 and 130 via the first supply pipes 115, 125 and 135. That is, the first central supplying portion 140a is connected to the first alignment material supplying units 114a to 114d of the first alignment layer forming line 110, the second central supplying portion 140b is connected to the second alignment material supplying units 124a to 124d of the second alignment layer forming line 120, and the third central supplying portion 140c is connected to the third alignment material supplying units 134a to 134d of the third alignment layer forming line 130. As such, the central supplying unit 140 is provided with the plurality of central supplying portions 140a to 140d, and each of the central supplying portions 140a to 140d is connected to the alignment material supplying units 114a-114d, 124a-124d and 134-134d of the corresponding alignment layer forming lines 110, 120 and 130, which allows the supply of the alignment material to each alignment layer forming line 110, 120 and 130 as much as being required (e.g., supplying a required type of alignment material or a required amount of alignment material, or the like), resulting in enabling the fabrication of multi-model LCD devices on the alignment layer forming lines 110, 120 and 130.

The first supply pipe 115 is diverged into a plurality of supply pipes. Valves 111a, 111b and 113 are disposed at each diverged point, thus to control a supply amount of alignment material supplied to the first alignment material supplying units 114a to 114d via the first supply pipe 115. Here, the valves 111a, 111b and 113 are implemented as electronic valves. When an alignment material in the first alignment material supplying units 114a to 114d is completely consumed, an external signal is inputted such that an alignment material in the central supplying portion 140a is supplied to the first alignment material supplying units 114a to 114d.

In the meantime, the first supply pipe 115 is provided with a filter 180. The filter 180 is configured to filter an alignment material which is supplied from the central supplying portion 140a to the first alignment material supplying units 114a to 114d to remove impurities from the alignment material, thereby preventing a defect of an alignment layer due to the impurities included in an alignment layer on a substrate.

In FIG. 4, the first supply pipe 115 is diverged twice and accordingly an alignment material of the central supplying portion 140a is supplied to the four first alignment material supplying units 114a to 114d. However, the first supply pipe 115 may be diverged more than three times such that an alignment material of the central supplying portion 140a can be supplied to more than 6 first alignment material supplying units 114a to 114d. Alternatively, the first supply pipe 115 may be diverged once such that an alignment material can be supplied to more than three first alignment material supplying units 114a to 114d.

Figure 5:
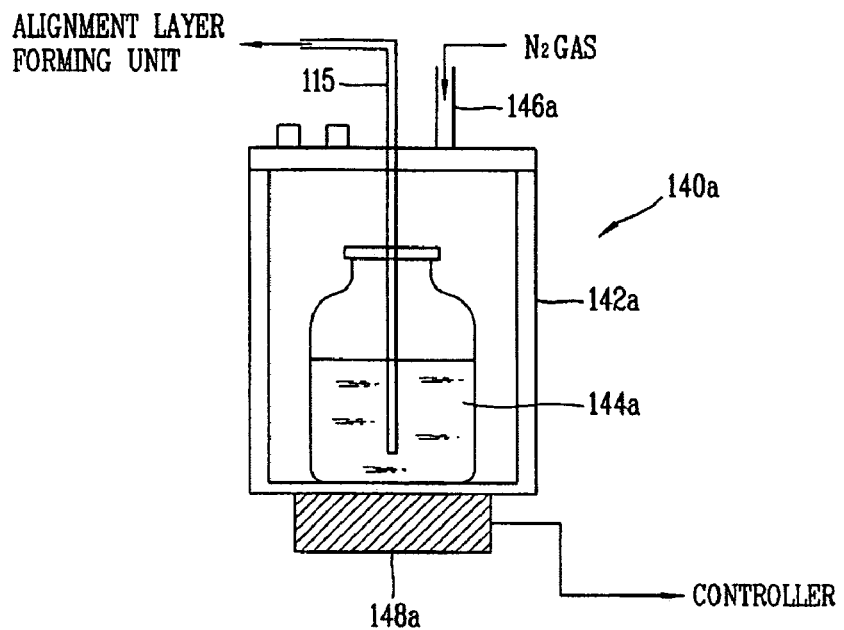
FIG. 5 is a view showing a configuration of a central supplying system in the apparatus for forming the alignment layer according to the present invention.
Figure 6:
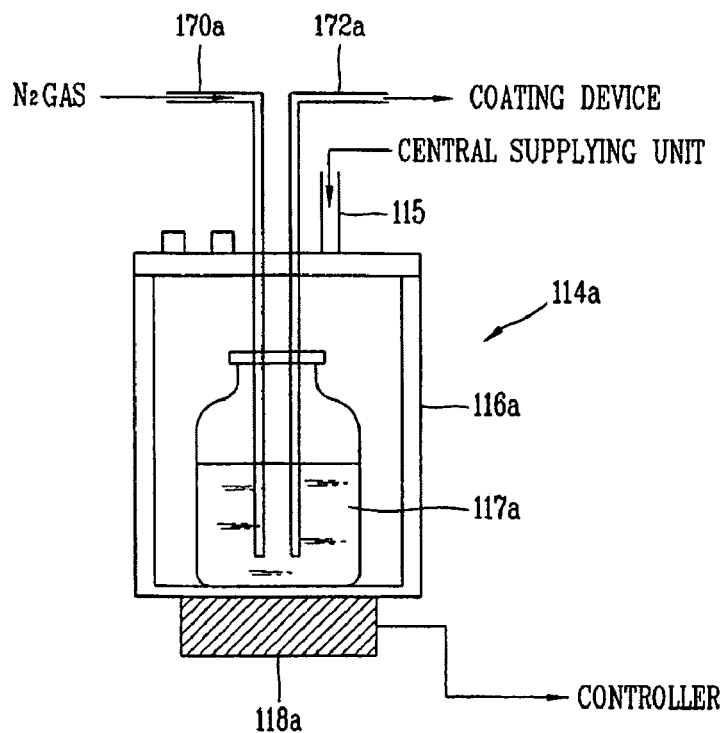
FIG. 6 is a view showing a configuration of an alignment material supplying unit in the apparatus for forming the alignment layer according to the present invention.

FIGS. 5 and 6 respectively show configurations of the central supplying portion 140a and the alignment material supplying unit 114a. The present invention is implemented such that the plurality of central supplying portions and the alignment material supplying unit 114a have the same configuration to each other. Thus, the description will representatively be given based upon the central supplying portion 140a and the alignment material supplying unit 114a as shown in FIGS. 5 and 6.

As shown in FIG. 5, the central supplying portion 140a includes a first tank 142a, a first alignment material container 144a disposed inside the first tank 142a for containing an alignment material therein, a first weight measuring portion 148a installed at a lower portion of the first tank 142a for measuring a weight of the first tank 142a, and a first gas supplying pipe 146a, formed at the first tank 142a, through which inactive gas, such as $N^2$ gas is supplied from the exterior to apply pressure onto the alignment material within the first alignment material container 144a.

As shown in FIG. 6, the alignment material supplying unit 114a includes a second tank 116a, a second alignment material container 117a disposed inside the tank 116a for containing an alignment material, a second weight measuring portion 118a installed at a lower portion of the second tank 116a for measuring a weight of the second tank 116a, a second gas supplying pipe 170a formed at the second tank 116a, through which inactive gas, such as $N^2$ gas is supplied from the exterior to apply pressure onto the alignment material within the first alignment material container 144a, and a second supplying pipe 172a formed at the second tank 172a for supplying the alignment material contained in the second alignment material container 117a to the alignment material coating device.

The first tank 142a of the central supplying portion 140a is connected to the second tank 116a of the alignment material supplying unit 114a via the first supplying pipe 115. Accordingly, gas, such as $N^2$ gas, is applied into the first tank 142a and pressure is thusly applied thereto. Simultaneously, as the valves 111a, 111b and 113 are open, the alignment material contained in the first alignment material container 144a of the first tank 142a is supplied into the second alignment material container 117a of the second tank 116a. Also, when inactive gas, such as $N^2$ gas, is supplied from the exterior to the second tank 116a of the alignment material supplying unit 114a via the second gas supplying pipe 170a, then pressure is applied to the second alignment material container 117a, whereby the alignment material contained in the second alignment material container 117a is supplied into the alignment material coating device.

The first and second weight measuring portions 148a and 118a are configured as weight sensors, thus to measure weights of the first and second tanks 142a and 116a, respectively (or to measure weights of the first and second alignment material containers 144a and 117a of the first and second tanks 142a and 116a, respectively). Here, the weights measured by the first and second weight measuring portions 148a and 118a may correspond to the weights of the alignment materials respectively contained in the first and second alignment material containers 144a and 117a because the weights of the first and second tanks 142a and 116a (or the first and second alignment material containers 144a and 117a) are preset to 0. The first and second weight measuring portions 148a and 118a are connected to a controller. Accordingly, the measured weights of the alignment materials are input to the controller. The controller then converts the input weights into volumes, thereby to detect the amount of the alignment material remaining in the first and second alignment material containers 144a and 117a.

When the remnant alignment material in the second alignment material container 117a is smaller than the amount of alignment material required for the one-time coating of an alignment layer, gas is supplied into the first tank 142a via the first gas supplying pipe 146a, so as to supply the alignment material contained in the first alignment material container 144a to the second alignment material container 117a via the first supplying pipe 115.

When the remnant alignment material in the first alignment material container 144a is smaller than the minimum amount of alignment material to be supplied into the second alignment material container 117a, the first alignment material container 144a is replaced with another first alignment material container 144a fully filled with the alignment material.

Although not shown in the drawing, the first alignment material container 144a is provided with a barcode. The barcode stores various information related to the alignment material contained in the first alignment material container 144a, for example, a type of alignment material, an amount of alignment material, the central supplying portion 140a to be accommodated and the like. Accordingly, such information is read out by a barcode reader (not shown), and thereafter the first alignment material container 144a is accommodated in the first tank 142a of the corresponding central supplying portion 140a.

Figure 7:
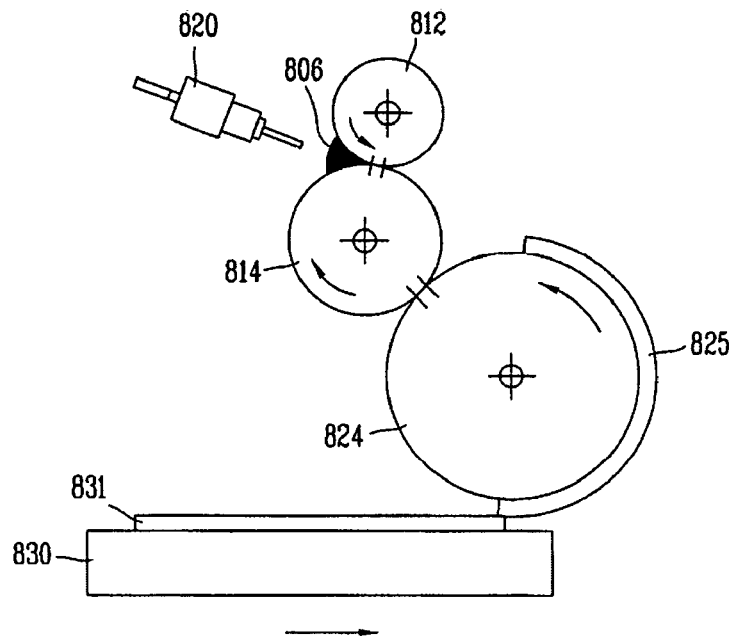
FIG. 7 is a view showing an exemplary alignment material coating device in the apparatus for forming the alignment layer according to the present invention.

FIG. 7 shows an alignment material coating device of the apparatus for forming the alignment layer according to the repent invention. In general, the alignment material can be coated by a variety of methods, such as a printing, an inkjet. Hereinafter, only an alignment material coating device using a printing method will exemplarily be described. Here, the present invention may not be limited to the alignment material coating device using the printing method but be applicable to a variety of currently well-known alignment material coating devices.

As shown in FIG. 7, in the alignment material coating device 800 using a printing method, an alignment material 806 supplied between cylindrical doctor roll 812 and anilox roll 814 is uniformly coated on the entire anilox roll 814 in cooperation with the rotation of the doctor roll 812 and the anilox roll 814. Here, the alignment material is supplied by a dispenser 820 in the shape of an injector connected to the second supplying pipe 172a as shown in FIG. 6. That is, as pressure is applied to the second tank 116a of the alignment material supplying unit 114a, the alignment material is transferred to the dispenser 820 via the second supplying pipe 172a, so as to be supplied between the doctor roll 812 and the anilox roll 814 via the dispenser 820.

In the meantime, when the anilox roll 814 rotates with coming in contact with a printing roll 824 having a rubber plate 825 attached on a certain portion of its surface, the alignment material on the surface of the anilox roll 814 is transferred onto the rubber plate 5. The rubber plate 825 corresponds to a substrate 831 on which the alignment material is to be coated, and has a mask pattern such that the alignment material can selectively be printed on the substrate 831. A printing table 830 having the substrate 831 laminated thereon moves with being contacted by the printing roll 824, and accordingly the alignment material transferred onto the rubber plate is re-transferred onto the substrate 831, thereby forming an alignment layer.

For coating an alignment material by an inkjet method, an inkjet head is connected to the second tank 117a of the alignment material supplying units 110a-110d, 120a-120d and 130a-130d, to supply the alignment material into the head via the second supplying pipe 172a, such that the alignment material can be coated onto a substrate. In other words, even when using the printing device or inkjet head, or other well-known alignment material coating device, the alignment material supplying system according to the present invention can be connected to the coating device to supply the alignment material, thereby allowing the coating of the alignment material.

The controller determines whether an alignment material is needed to be supplied to the first and second alignment material containers 144a and 117a, based upon the weights of the alignments materials of the first and second tanks 142a and 116a (or the first and second alignment material containers 144a and 117a), which are measured by the first and second weight measuring portions 148a and 118a, respectively. If there is an insufficient amount of alignment materials left in each container, the controller controls the alignment material to be supplied into the first and second alignment material containers 144a and 117a.

Figure 8:
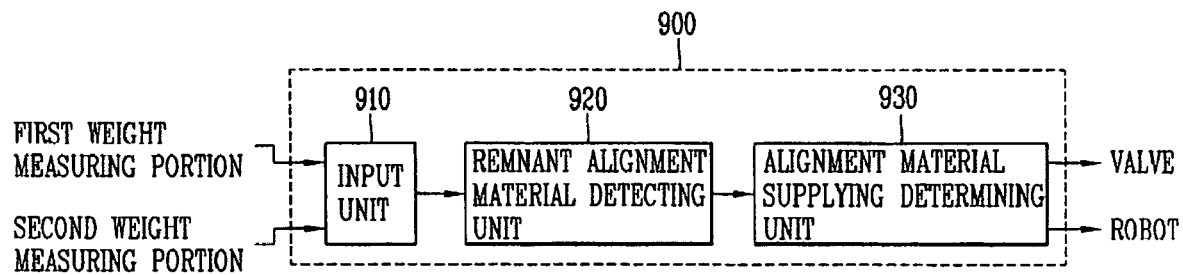
FIG. 8 is a flowchart showing a configuration of a controller of the apparatus for forming the alignment layer according to the present invention.

FIG. 8 is a block diagram showing a controller of the apparatus for forming the alignment layer according to the present invention.

As shown in FIG. 8, a controller 900 may include an input unit 910 in which the weights of alignment materials included in each of the first and second alignment material containers 144a and 117a, are input, the weights being measured by the first and second weight measuring portions 148a and 118a, an remnant alignment material detecting unit 920 for converting into volumes the weights of the alignment materials contained in the first and second alignment material containers 144a and 117a input via the input unit 910 so as to detect each remnant amount of the alignment material within the first and second containers 144a and 117a, and an alignment material supplying determining unit 930 configured such that when the alignment material is needed to be supplied into the first and second alignment material containers 144a and 117a based upon the remnant amount of the alignment material detected by the remnant alignment material detecting unit 920, the alignment material supplying determining unit 930 outputs a signal to the valves 111a 111b and 113 and opens the valves 111a 111b and 113, to supply the alignment material into the second alignment material container 117a via the first supplying pipe 115, or outputs a signal to a robot (not shown) to replace the first alignment material container 144a of the central supplying portion 140a with a new first alignment material container 144a fully containing the alignment material.

The controller 900 controls every component of the alignment layer forming lines, such as driving and control of the alignment material coating device 800, driving and control of a substrate and the like, as well as supplying of the alignment material supplied to the alignment material coating device 800.

Figure 9:
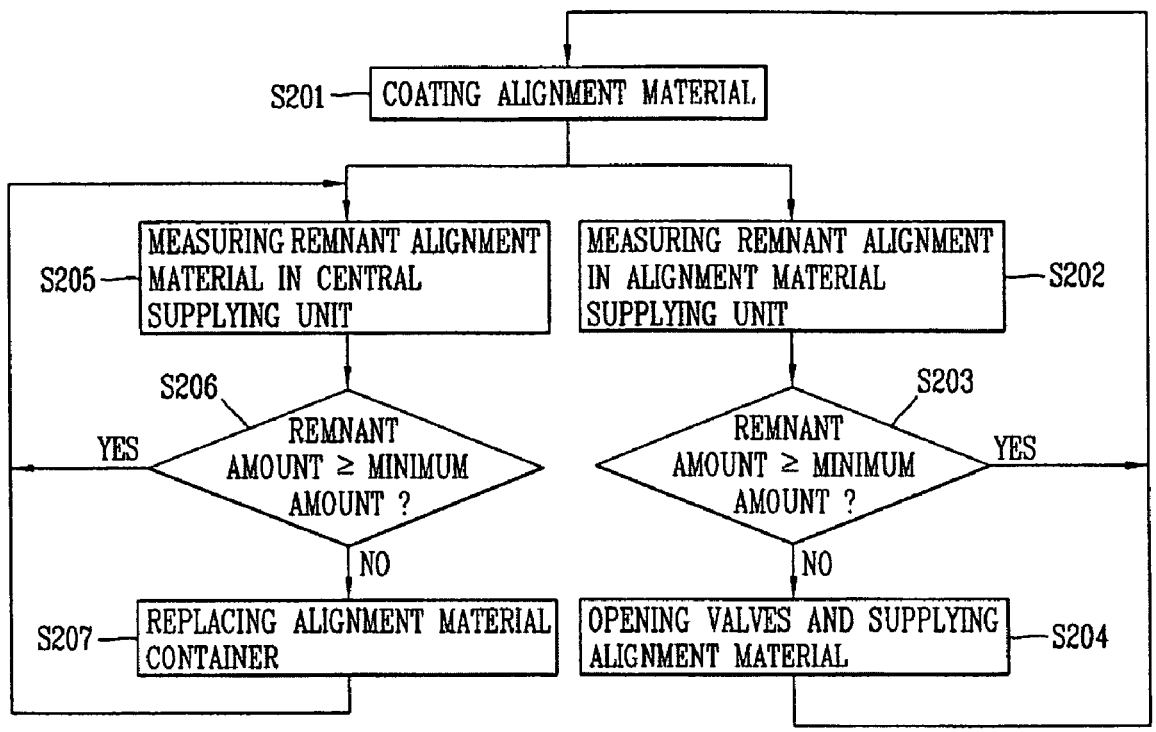
FIG. 9 is a flowchart showing a method for forming an alignment layer in the apparatus for forming the alignment layer according to the present invention.

FIG. 9 is a flowchart showing a method for forming an alignment layer in the apparatus for forming the alignment layer according to the present invention, which will be described as follows.

As shown in FIG. 9, an alignment material is coated on a substrate by the alignment material coating device 800, as shown in FIG. 7, to which the alignment material is supplied from the second alignment material container 117a of the alignment material supplying unit 110a (S201). At this time, the weight of the alignment material contained in the second alignment material container 117a is measured by the second weight measuring portion 118a in real time (S202). The controller 900 converts the measured weight of the alignment material into a volume to compare the converted remnant amount of alignment material with a minimum amount thereof, namely, an amount as much as being coated per each time (S203). If the remnant amount is greater than the minimum amount, the controller 900 determines that the alignment material can be coated at least one time, so as to continuously coat the alignment material. If the remnant amount is smaller than the minimum amount, the controller 900 opens the valves 111a, 111b and 113 formed at the first supplying pipe 115 to supply the alignment material of the central supplying unit 140 to the alignment material supplying units 110a-110d, 120a-120d and 130a-130d via the first supplying pipe 115 (S204).

In the meantime, the first weight measuring portion 148a measures the weight of the alignment material contained in the first alignment material container 144a (S205). The measured weight is converted into a volume to detect the remnant amount of the alignment material, and thereafter the detected remnant amount is compared with a minimum amount of alignment material (S206). Here, the minimum amount of the alignment material in the first alignment material container 144a may be set to be the same as a maximum amount of the alignment material in the second alignment material container 117 or half or one third of the maximum amount.

If the remnant amount of the alignment material in the first alignment material container 144a is greater than the minimum amount, it is determined that the second alignment material container 117a is filled with a sufficient amount of alignment material to be supplied to the second alignment material container 117a. On the other hand, if the remnant amount of the alignment material in the first alignment material container 144a is smaller than the minimum amount, it is determined to replace the first alignment material container 144a with a new first alignment material container 144a fully filled with the alignment material (S207). Here, the replacement of the first alignment material container 144a may be performed by a robot. That is, according to a signal of the controller 900, the robot reads information recorded in a barcode of the first alignment material container 144a, and carries the first alignment material container 144a filled with the corresponding alignment material to accommodate in the first tank 142a.

The alignment material is then supplied from the replaced alignment material container 144a to the second alignment material container 117a. The alignment material is then supplied from the second alignment material container 117a into the alignment material coating device 800 to be coated on a substrate. The coated alignment material is fired and rubbed and accordingly an alignment layer is formed, having a determined alignment direction.

The supplying system according to the present invention has been limited to an alignment material in the foregoing description but the present invention may not be limited to the alignment materials. For example, the supplying system according to the present invention can be employed in various apparatuses such as a liquid crystal dispensing apparatus or a seal line forming apparatus. In other words, the supplying system according to the present invention may be employed in a liquid crystal dispensing apparatus for automatically supplying a liquid crystal to form a liquid crystal layer or a seal line forming apparatus for automatically supplying a sealant to form a seal line on a substrate.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An apparatus for forming an alignment layer comprising:
    at least one alignment layer forming line having a plurality of alignment layer forming units;
    a plurality of alignment material coating devices disposed at each alignment layer forming unit and configured to coat an alignment material on a substrate of the corresponding alignment layer forming units;
    at least one alignment material supplying unit having a plurality of second alignment material containers for supplying the alignment material to each alignment material coating device;
    a central supplying unit connected to the at least alignment material supplying unit and having at least one first alignment material container for supplying the alignment material to the at least one alignment material supplying unit;
    a supplying pipe configured to connect the at least one alignment material supplying unit to the central supplying unit; and
    a controller configured to measure the remnant amount of alignment material of the at least one alignment material supplying unit so as to supply the alignment material in the first alignment material container to the plurality of second alignment material containers via the supplying pipe when the measured remnant amount of the alignment material is smaller than a minimum amount thereof, and to measure the remnant amount of the alignment material in the central supplying unit so as to replace the first alignment material container with a new first alignment material container fully filled with the alignment material when the remnant amount of the alignment material in the central supplying unit is smaller than the minimum amount thereof.

2. The apparatus of claim 1, wherein the alignment layer forming line is implemented as multi-model alignment layer forming lines which form different models of alignment layers, and the central supplying unit is provided with a plurality of supplying portions each configured to supply the alignment material to the alignment material supplying unit, the alignment material supplying unit supplying the alignment material to the alignment material coating device on each multi-model alignment layer forming line.

3. The apparatus of claim 1, further comprising valves disposed at the supplying pipe and configured to be open according to a signal of the controller so as to control the supply amount of the alignment material supplied from the central supplying unit to the alignment material supplying unit.

4. The apparatus of claim 1, wherein the alignment material supplying unit comprises:
    a second tank in which the second alignment material container is accommodated;
    a supplying pipe disposed at the second tank and configured to supply the alignment material to the alignment material coating device; and
    a second gas supplying pipe disposed at the second tank and configured to apply pressure to the alignment material in the second alignment material container in cooperation with gas supplied therethrough.

5. The apparatus of claim 1, wherein the central supplying unit comprises:
    a first tank in which the first alignment material container is accommodated; and
    a first gas supplying pipe disposed at the first tank, and configured to supply the alignment material to the alignment material supplying unit by applying pressure to the alignment material within the alignment material container in cooperation with gas supplied therethrough.

6. The apparatus of claim 1, further comprising a filter disposed in the supplying pipe and configured to filter the alignment material supplied from the central supplying unit to the alignment material supplying unit.

7. The apparatus of claim 1, further comprising a robot configured to replace the first alignment material container with a new first alignment material container fully filled with the alignment material according to a signal of the controller when the remnant amount of the alignment material in the central supplying unit is smaller than a minimum amount thereof.

8. The apparatus of claim 1, further comprising:
    a first weight measuring portion disposed at the alignment material supplying unit and configured to measure the weight of the alignment material in the alignment material supplying unit; and
    a second weight measuring portion disposed at the central supplying unit and configured to measure the weight of the alignment material in the central supplying unit.

9. The apparatus of claim 1, wherein the controller comprises:
    an input unit in which the weights of the remnant alignment materials measured by the first and second weight measuring portions are input;
    an alignment material remnant amount detecting portion configured to convert into volumes the weights of the remnant alignment materials input from the first and second weight measuring portions so as to detect each remnant amount of the alignment material; and an alignment material supplying determining portion configured to operate the valves when the alignment material should be supplied to the alignment material supplying unit based upon the remnant amount of the alignment material detected by the alignment material remnant amount detecting portion and operate the robot when the alignment material should be supplied to the central supplying unit.

10. The apparatus of claim 1 wherein the alignment material coating device comprises an inkjet apparatus and a roll printing apparatus.

11. The apparatus of claim 1, further comprising a barcode disposed at the first alignment material container and including various information related to the alignment material contained in the first alignment material container.

12. A system for supplying a coating material comprising:
at least one coating material supplying unit having at least one first container for supplying a coating material to a coating device;
a first weight measuring portion disposed at the coating material supplying unit to measure the weight of the coating material in the coating material supplying unit;
a central supplying unit connected to the coating material supplying unit and having at least one second container for supplying the coating material to the coating material supplying unit;
a second weight measuring portion disposed at the central supplying unit to measure the weight of the coating material in the central supplying unit;
a supplying pipe configured to connect the coating material supplying unit to the central supplying unit; and
a controller configured to measure the remnant amount of coating material of the at least one coating material supplying unit based on the weights measured by the first weight measuring portion and the second weight measuring portion so as to supply the coating material in the second container to the first container when the measured remnant amount of the coating material is smaller than a minimum amount thereof, and to measure the remnant amount of the coating material in the central supplying unit so as to replace the second container with a new second container fully filled with the coating material when the remnant amount of the coating material in the central supplying unit is smaller than the minimum amount thereof.

13. The system of claim 12, wherein the coating material supplying unit comprises:
a first tank in which the first container is accommodated;
a supplying pipe disposed at the first tank and configured to supply the coating material to the coating material coating device; and
a first gas supplying pipe disposed at the first tank and configured to apply pressure to the coating material in the first container in cooperation with gas supplied therethrough.

14. The system of claim 12, wherein the central supplying unit comprises:
a second tank in which the second container is accommodated; and
a second gas supplying pipe disposed at the second tank and configured to supply the coating material to the coating material supplying unit by applying pressure to the coating material within the second container in cooperation with gas supplied therethrough.

* * * * *